Nov. 3, 1970  R. E. JONES  3,538,426
SERIES REGULATOR WITH CURRENT LIMITER
Filed Feb. 6, 1968
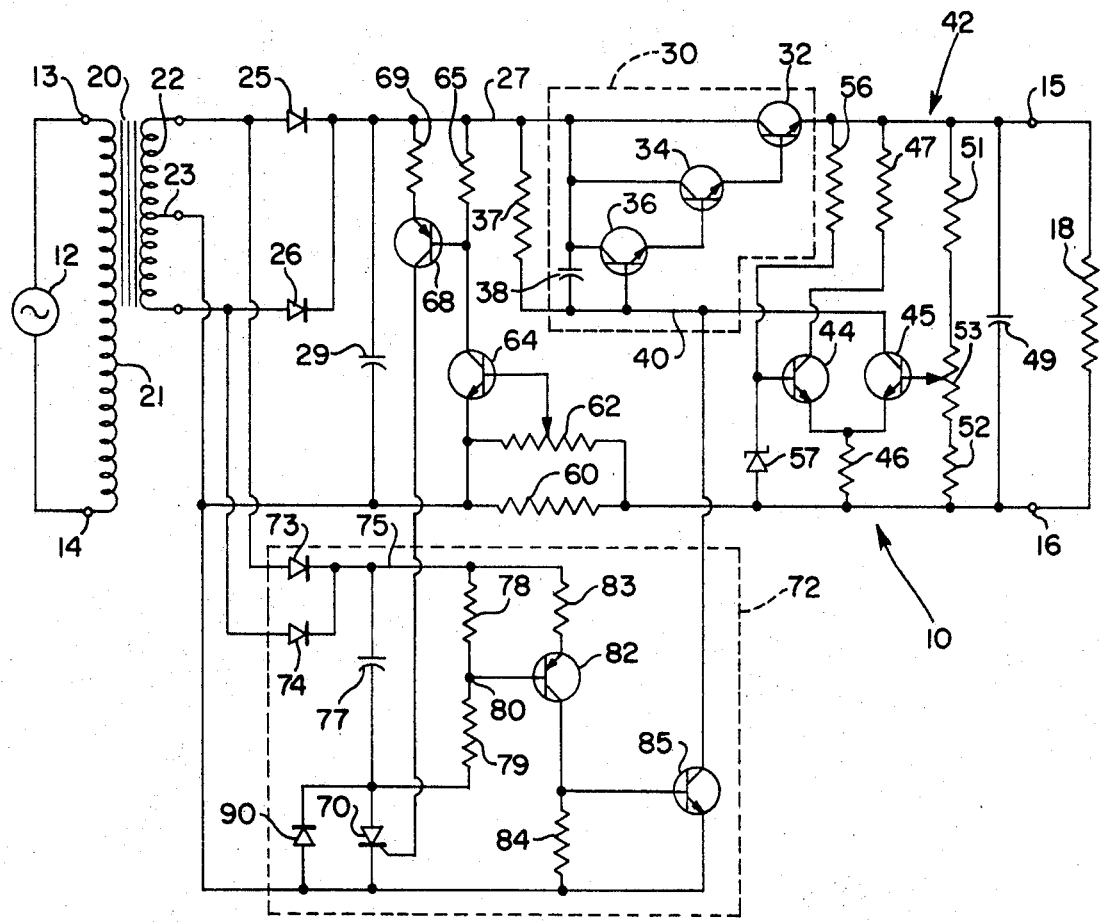
INVENTOR
ROBERT E. JONES
BY
Oberlin, Maky, Donnelly & Renner
ATTORNEYS United States Patent Office
3,538,426
Patented Nov. 3, 1970

3,538,426
SERIES REGULATOR WITH CURRENT LIMITER
Robert E. Jones, Wesleyville, Pa., assignor to Elgin Electronics Incorporated, Erie, Pa., a corporation of Ohio
Filed Feb. 6, 1968, Ser. No. 703,460
Int. Cl. G05f 1/58, 1/64
U.S. Cl. 323—9
6 Claims

ABSTRACT OF THE DISCLOSURE

A voltage regulator having a series transistor regulator element responsive in normal operation to a conventional differential amplifier control stage and under overcurrent conditions to a control override stage. The latter includes a resistor in series connection with the output circuit for generating a trigger signal for an SCR in an RC timing circuit arrangement which overrides the differential amplifier control stage for a predetermined interval to prevent output current. At the end of the interval normal operation is automatically resumed and a recycling of the action of the override stage will occur so long as the overcurrent condition persists.

This invention relates to solid state regulator circuits for supplying DC voltage at relatively high current levels to typical load devices and relates more particularly to a series type regulator which utilizes the variable voltage dropping characteristics of a series element for maintaining the output voltage at a constant level and for avoiding overload conditions.

Regulator circuits have become commonplace in the art for converting AC power to a specified level of DC voltage at a desired current level. Solid state components are used extensively in these circuits and frequently include a series connected voltage dropping transistor whose impedance characteristics may be varied by an electrical signal applied to the control electrode. Such solid state devices are extremely sensitive to excessive power dissipation caused by short circuit or overcurrent conditions and means must be provided to prevent the destruction of these components. Usually, the regulator components are grossly overrated to accommodate these situations and often the regulator may be fused or special circuitry may be provided to determine such excessive conditions to interrupt the operation of the regulator circuit. However, many of these protection devices are limited in not providing automatic reestablishment of the desired voltage and current levels upon the cure or removal of the factor causing the overload condition. Thus, especially in remote applications where temporary short circuits or overload conditions may be encountered, a resettable circuit would by advantageous in not requiring the intervention of technical personnel.

The circuit of this invention provides a continuous monitor of output load conditions and effects a reduction of output power when an undesirable condition is detected. Timing circuitry is utilized to sample the output conditions at desired intervals and to permit only temporary full conduction during overload conditions thereby limiting the power dissipation of the series regulator element to safe levels. When the circuit has established that the fault has been eliminated, the regulator is returned to normal operation upon completion of that sampling interval. Such sampling and override control of the series regulator element is provided by a novel timing and control circuit which utilizes a minimum of solid state components and is readily incorporated in many existing regulator circuits.

Therefore, it is an object of this invention to provide a regulator circuit which provides an overcurrent protection feature and an automatic reestablishment of operating conditions upon removal of a load fault.

It is another object of this invention to provide an improved regulator circuit which includes a continuous monitor of output load conditions both during normal load and fault conditions.

It is still another object of this invention to provide an improved voltage regulator circuit which samples output load conditions at predetermined intervals of time to control the power dissipation of the regulator element of the circuit.

It is a further object of this invention to provide an improved series type voltage regulator circuit which utilizes control of the series regulator element to maintain normal output voltage levels and to prevent output voltage during overcurrent or short cicuit load conditions.

It is a still further object of this invention to provide an improved timing and sampling circuit for a voltage regulator which incorporates an SCR in a novel configuration for initiating and controlling the timing interval of the regulator.

It is yet another object of this invention to provide an improved voltage regulator which utilizes only solid state components and is more economical than known prior devices.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

The drawing is a schematic circuit diagram of the series regulator of this invention shown in relation to a typical power source and load device.

The regulator 10 of the invention is shown connected to an AC power source 12 which may be a typical source of supply providing a 115 volt 60 cycle AC signal at input terminals 13, 14. Output terminals 15, 16 are provided for the regulator 10 and have a load 18 connected thereacross, the load 18 comprising for purposes of description, a pure resistance element typical of any type of load which would require approximately 10 volts DC at the output terminals 15, 16 at a current level of approximately 2 amperes.

An input transformer 20 is provided having a primary winding 21 connected to the input terminals 13, 14 of the regulator 10 and thus to the power source and a secondary winding 22 with a center tap 23 connection. A pair of rectifiers 25, 26 are connected to either end of the secondary winding 22 and have a common cathode connection to provide full wave rectification and a positive voltage at line 27 in relation to the center tap 23 of the transformer 20. A filter condenser 29 is connected between line 27 and the center tap 23 to provide a smoothing of the rectified DC voltage and it will be appreciated that many similar types of input rectifier circuits may be substituted herein. A regulator circuit 30 (shown in dashed lines) including a regulating element 32 in the form of a power transistor having its collector connected to line 27 and its emitter connected to the positive output terminal 15 effects the voltage control within the circuit to maintain a desired voltage level at the output terminal 15. The variation in voltage is dependent upon the variable impedance effect of the power transistor 32 as controlled by a signal applied at its base electrode. A current amplification scheme consisting of direct coupled transistors 34, 36 provide the control signal to the base of the regulator element 32, bias conditions being effected by a resistor 37 and condenser 38 connected between the base of transistor 36 and line 27. It will be appreciated then that a control signal appearing on line 40, at the base of transistor 36 is effective to control the conduction of the regulator element 32 and thus the voltage drop across the element 32.

A voltage control circuit shown generally at 42, is provided for supplying the control signal to the regulator circuit 30 and consists of a pair of transistors 44, 45 connected in a differential amplifier configuration utilizing a common emitter resistor 46 and having collector electrodes connected respectively through resistor 47 to the output terminal 15 and resistor 37 to line 27. A further filter condenser 49 is connected between the output terminals 15, 16 of the regulator 10 and a voltage divider, consisting of resistors 51, 52 and a variable potentiometer 53, is also connected therebetween to provide an adjustable voltage level for application to the differential amplifier. A reference voltage is supplied to the base electrode of transistor 44, being realized at the junction of series resistor 56 and Zener diode 57 connected between the output terminals 15, 16.

Thus in normal operation of this control circuit 42, the voltage at the slider of the potentiometer 53 will be a proportion of the voltage appearing at the output terminals 15, 16 and will be compared with the reference voltage appearing across the Zener diode 57 in the differential amplifier to provide a control signal on line 40 at the base of transistor 36. Such signal will control the regulator element 32 so that an increased voltage drop across the regulator element 32 will be effected when the voltage at the output terminals 15, 16 is increased and vice versa to maintain output voltage at a constant level.

The negative output terminal 16 of the regulator 10 provides a common potential for much of the regulator circuit and is connected through resistor 60 to the center tap 23 of the power transformer 20. Normal current flow will occur from the positive output terminal 15 through the load 18, to the negative output terminal 16 and through resistor 60 to the center tap 23 of the transformer 20, thereby creating a voltage drop across resistor 60 proportional to the current flow through the load 18. A potentiometer 62 having its resistance element connected in parallel with resistor 60 provides a means for selecting a portion of the voltage drop appearing across resistor 60. The voltage appearing at the slider of the potentiometer 62, in turn, is connected to the base of amplifier transistor 64 of NPN type having its emitter connected to the center tap 23 of the transformer 20 and its collector connected through a resistance 65 to line 27. A PNP type gate transistor 68 has its base electrode connected directly to the collector of transistor 64, its emitter connected through resistor 69 to line 27 and its collector connected to the gate electrode of a silicon controlled rectifier (SCR) 70 in the timing portion 72 of the circuit.

The timing circuitry 72 receives its energization from a pair of rectifiers 73, 74 connected to the secondary winding 22 of the power transformer 20 and having a common cathode connection to provide full wave rectification at line 75. One terminal of a filter condenser 77 is connected to line 75 and the other terminal of the condenser 77 is connected to the anode of the SCR 70 which has its cathode connected directly to the center tap 23 of the transformer 20. It will be apparent then that when a suitable gating signal is applied to the SCR 70 from the gate transistor 68, forward bias of the SCR 70 from line 75 will cause conduction through the condenser 77 and the SCR 70 to effect a charging of the condenser 77 to approximately the peak value of the voltage supplied at the secondary 22 of the power transformer 20. The voltage drop across the SCR 70 during conduction will be very small and may be considered negligible.

The voltage across the condenser 77 is divided in the series resistor network 78, 79 to provide a voltage at the mid-connection 80 for application to the base of PNP type amplifier transistor 82. The emitter of transistor 82 is connected through resistor 83 to line 75 and the collector is connected through resistor 84 to the center tap 23 of the transformer 20. The collector signal of transistor 82 is applied directly to the base of NPN type transistor 85 having the emitter connected to the center tap 23 of the transformer 20 and the collector connected directly to the control line 40 of the regulator circuit 30.

The operation of the regulator 10 is essentially as follows: current flowing through resistor 60 in normal operation develops insufficient voltage across potentiometer 62 at the setting of the slider to cause conduction of amplifier transistor 64 or gate transistor 68 which are normally biased to the off condition. In this normal condition insufficient gating signal is applied to the SCR 70 to cause it to trigger into conduction. However, when an overload or short circuit condition exists in the load 18 thereby causing a current flow greater than the normal maximum value, a somewhat larger voltage will be developed across resistor 60 creating a forward bias and conduction of transistor 64 and a subsequent forward bias and conduction of transistor 68 to provide a sufficient gating signal at the gate electrode to the SCR 70.

Conduction of the SCR 70 will occur and the condenser 77 will be charged through the rectifiers 73, 74 to develop a voltage on line 75 sufficient to create a forward bias and conduction of transistor 82 and a positive voltage across its collector resistor 84. Transistor 85 will be sufficiently forward biased to cause current flow through resistor 37 and to create a voltage drop across transistor 85 equal to its saturation voltage. The conduction of transistor 85 will create a low impedance path effectively shunting the normal control signal from the differential amplifier circuit 42 thereby bringing the level of the control signal on line 40 to only a small potential above the level of the center tap 23 of the transformer 20. Such low voltage will prevent conduction of the regulator element 32 thereby raising its impedance to a high value and causing the output voltage at the output terminal 15 to drop to a low value. Similarly, output current through the load 18, even under short circuit conditions, will drop to a corresponding low value and prevent destruction of the load and the regulator 10 components. The low current will also reduce the voltage drop across resistor 60 and eliminate the forward bias conditions, thus turning off the transistors 64, 68 to remove gate current from the SCR 70.

Since the condenser 77 has charged to approximately the peak value of the secondary voltage of the transformer 20, rectifiers 73, 74 will be back biased for a great portion of the power source 12 cycle and the condenser 77 will discharge through a path consisting of resistor 83, transistor 82 and resistor 84 creating a reverse bias upon the SCR 70 and thus, a commutation of the SCR 70 in the absence of a gating signal from transistor 68. Continued dissipation of the charge of the condenser 77 will also occur through the network of series resistors 78, 79 until a voltage level is reached at junction 80 when transistors 82, 85 will be cut off. During these discharges, collector current for transistor 82 and base current for transistor 85 is provided by diode 90 which becomes forward biased. The cutoff condition of transistor 85 will create a high impedance through transistor 85 and a return of the control of the series regulator element 32 to the control signal appearing on line 40 and developed in the differential amplifier 42 thereby resuming normal operating conditions for the regulator circuit. If the load fault has been corrected in this interval, normal load current will flow and further initiation of the sampling circuitry will be prevented by the absence of a gating signal from transistor 68. However, if excessive current still occurs through the load 18 then a higher voltage drop will obtain across resistor 60 and a sufficient gate signal will be developed to recycle the sampling circuitry in the manner identical to that previously described.

Such recycling or sampling will continue as long as an overcurrent condition exists such that condenser 77 will be alternately charged and discharged under control of SCR 70 and the current sense amplifier transistor 64. The charging time of condenser 77 will be rather rapid and occur within a few cycles of the power source 12, however, the discharge time may be varied by the choice of values of resistances 78, 79, 93, 84 to achieve a predetermined delay before transistors 82, 85 become cut off and control of the regulator element 32 is returned to the differential amplifier control circuit 42 for normal operation.

Under overload conditions, in the sampling mode of operation, the regulator element 32 is required to conduct overload current for only a short period of time, this being the time required for condenser 77 to charge to a sufficient potential to turn on transistors 82, 85. The discharge time of condenser 77 is adjusted so that regulator element 32 is substantially cut off for a much longer interval, on the order of several seconds, so that the duty cycle of regulator element 32 is quite low under overload conditions. It is clear that an economy of components may be realized in that the regulator element 32 need not be overrated as in conventional systems since such pulsed overload conditions can be tolerated. It is also clear that large heat sinks are not necessary for the regulator element 32 and a resulting economy in package size accrues.

It is apparent, also, that many variations might be possible in a system of this type or that such sampling circuitry might be adapted in other systems. Thus, for example, a different type of control circuit might be substituted for the differential amplifier circuit 42 or the manner of applying the control signals from the differential amplifier 42 and the transistor amplifier 85 to the control line 40 may be devised. Similarly, the sampling circuitry may be incorporated in other than series type regulators to provide a protection for overcurrent conditions.

I, therefore, particularly point out and distinctly claim as my invention:

1. A voltage regulator for providing a constant output voltage to a load within a predetermined current range, comprising a source of unregulated DC voltage, means for varying the DC voltage to provide an output voltage to a load, said varying means being operative in response to a control signal, first means for sensing the value of the output voltage and for providing a first control signal to said varying means to maintain the output voltage at a constant value, a resistor serially connected with the load for providing a voltage drop thereacross proportional to load current, means for sensing a voltage drop across said resistor greater than a predetermined maximum value and for providing a gating signal representative of such condition, generating means responsive to the gating signal for providing a second control signal to said varying means, and a timing circuit initiated in response to the gating signal of said sensing means and operative to actuate said generating means for a predetermined time interval, said timing circuit comprising a condenser and a silicon controlled rectifier serially connected across a source of rectified AC voltage, said silicon controlled rectifier being triggered into conduction for charging said condenser by the gating signal of said sensing means and being commutated by the reverse bias of said condenser when fully charged in the absence of the gating signal, said generating means being connected to said condenser to receive conduction bias therefrom and being effective to discharge said condenser in a predetermined time interval.

2. A voltage regulator as set forth in claim 1, wherein said varying means comprises a power transistor serially connected with said source of unregulated DC voltage, the control signal being connected to the base electrode to control the conduction of said transistor, and said first means comprises a differential amplifier stage having a reference voltage input and a second input proportional to the output voltage, the output of the differential amplifier being the first control signal.

3. In a voltage regulator having a series regulator element and an output voltage sensing stage for controlling the conduction of the regulator element to maintain a constant output voltage, a circuit for overriding the control stage to prevent conduction of the regulator element under overcurrent output conditions and for automatically reestablishing normal operating conditions, comprising means for developing a signal related to output current of the regulator, an SCR adapted to receive said signal as a gating input, said SCR being conditioned for conduction when said signal attains a level indicative of an overcurrent condition, a capacitor in series connection with said SCR, a source of DC power connected across the series combination of said capacitor and SCR to form a charging circuit when said SCR is conductive, means operatively connected to said capacitor and responsive to a predetermined level of voltage thereacross for preventing conduction of the regulator element, and means for discharging the voltage occurring across said capacitor whereby said capacitor is charged and discharged under overcurrent conditions to intermittently prevent conduction of the regulator element and remains discharged under normal current conditions to allow operation from the control stage.

4. The circuit as set forth in claim 3 wherein the control stage is a differential amplifier having an output connected to the regulator element and said preventing means comprises a transistor amplifier having an output connected to the regulator element for shunting the output of said differential amplifier under overcurrent conditions.

5. The circuit as set forth in claim 4 wherein said discharging means comprises a second transistor amplifier connected across the series combination of said capacitor and SCR, said second amplifier being adapted for conduction when the voltage across said capacitor attains a predetermined level.

6. The circuit as set forth in claim 5 wherein said discharging means further includes a diode in shunt connection across said SCR, said diode being oppositely poled with respect to said SCR, and providing a return path for discharge current.

References Cited

UNITED STATES PATENTS

| | | | |
|---|---|---|---|
| 3,192,441 | 6/1965 | Wright | 317—33 |
| 3,373,341 | 3/1968 | Wattson | 323—9 |

J D MILLER, Primary Examiner

A. D. PELLINEN, Assistant Examiner

U.S. Cl. X.R.

317—22; 321—11, 19; 323—38